US012018586B2

(12) United States Patent
Yamarthi et al.

(10) Patent No.: US 12,018,586 B2
(45) Date of Patent: Jun. 25, 2024

(54) AIRFOIL ASSEMBLY WITH TENSIONED BLADE SEGMENTS

(71) Applicant: General Electric Company, Schenectady, NY (US)

(72) Inventors: David Raju Yamarthi, Bengaluru (IN); Ravindra Shankar Ganiger, Bengaluru (IN); Vasanth Kumar Balaramudu, Bengaluru (IN); Vishnu Vardhan Venkata Tatiparthi, Bengaluru (IN); Nitesh Jain, Bengaluru (IN); Vidyashankar Ramasastry Buravalla, Bengaluru (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/081,151

(22) Filed: Dec. 14, 2022

(65) Prior Publication Data

US 2024/0076989 A1 Mar. 7, 2024

(30) Foreign Application Priority Data

Sep. 6, 2022 (IN) ............................. 202211050868

(51) Int. Cl.
*F01D 5/14* (2006.01)

(52) U.S. Cl.
CPC .......... *F01D 5/147* (2013.01); *F05D 2230/60* (2013.01)

(58) Field of Classification Search
CPC ........ F01D 5/147; F01D 5/282; F01D 21/045; F01D 5/284; F04D 29/388; F04D 25/084
See application file for complete search history.

(56) References Cited

U.S. PATENT DOCUMENTS

| | | | | |
|---|---|---|---|---|
| 2,660,252 | A | 11/1953 | Doussain et al. | |
| 2,843,355 | A | 7/1958 | Findley | |
| 4,029,434 | A | 6/1977 | Kenney | |
| 4,071,184 | A | 1/1978 | Carlson et al. | |
| 4,285,634 | A | 8/1981 | Rossman et al. | |
| 7,517,198 | B2 * | 4/2009 | Baker | F03D 1/0633 416/227 R |
| 9,488,056 | B2 | 11/2016 | Nagle et al. | |
| 9,579,714 | B1 | 2/2017 | Rutkowski | |
| 9,651,024 | B2 * | 5/2017 | Soloway | F03D 1/0675 |
| 9,745,956 | B2 * | 8/2017 | Johnson | F03D 1/0658 |
| 10,415,588 | B2 | 9/2019 | Roche | |
| 10,815,795 | B2 | 10/2020 | Ganiger et al. | |
| 11,220,994 | B2 * | 1/2022 | Bürkner | F03D 1/0658 |
| 2011/0142675 | A1 * | 6/2011 | van der Bos | F03D 1/0675 416/241 R |

(Continued)

FOREIGN PATENT DOCUMENTS

| | | | |
|---|---|---|---|
| WO | WO-2021160383 | A1 * | 8/2021 |
| WO | WO2021160383 | A1 | 8/2021 |

*Primary Examiner* — Sabbir Hasan
*Assistant Examiner* — Arthur Paul Golik
(74) *Attorney, Agent, or Firm* — Dority & Manning, P.A.

(57) ABSTRACT

An airfoil assembly extends along a radial direction between a root and a tip, the airfoil assembly comprising: a first blade segment positioned proximate the root of the airfoil assembly; a second blade segment positioned adjacent the first blade segment along the radial direction; and a tensioning assembly comprising a plurality of tensioning strings that extend between and mechanically couple the first blade segment and the second blade segment.

20 Claims, 8 Drawing Sheets

(56) References Cited

U.S. PATENT DOCUMENTS

| | | | | |
|---|---|---|---|---|
| 2012/0014796 | A1* | 1/2012 | Cartwright ............ | F04D 25/088<br>29/889.3 |
| 2020/0408193 | A1* | 12/2020 | Kachhia ................ | F03D 1/0675 |

* cited by examiner

SECTION 3-3

SECTION 4-4

SECTION 5-45

AIRFOIL ASSEMBLY WITH TENSIONED BLADE SEGMENTS

PRIORITY INFORMATION

The present application claims priority to Indian Patent Application Serial Number 202211050868 filed on Sep. 6, 2022.

FIELD

The present disclosure relates to gas turbine engines, and more particularly, to airfoil assemblies and methods for manufacturing the same.

BACKGROUND

A gas turbine engine typically includes a fan assembly and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight or to power a load, such as an electrical generator. In a turbofan engine, the fan assembly generally includes a fan having a plurality of airfoils or fan blades extending radially outwardly from a central hub and/or a disk. During certain operations, the fan blades provide an airflow into the turbomachine and over the turbomachine to generate thrust.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
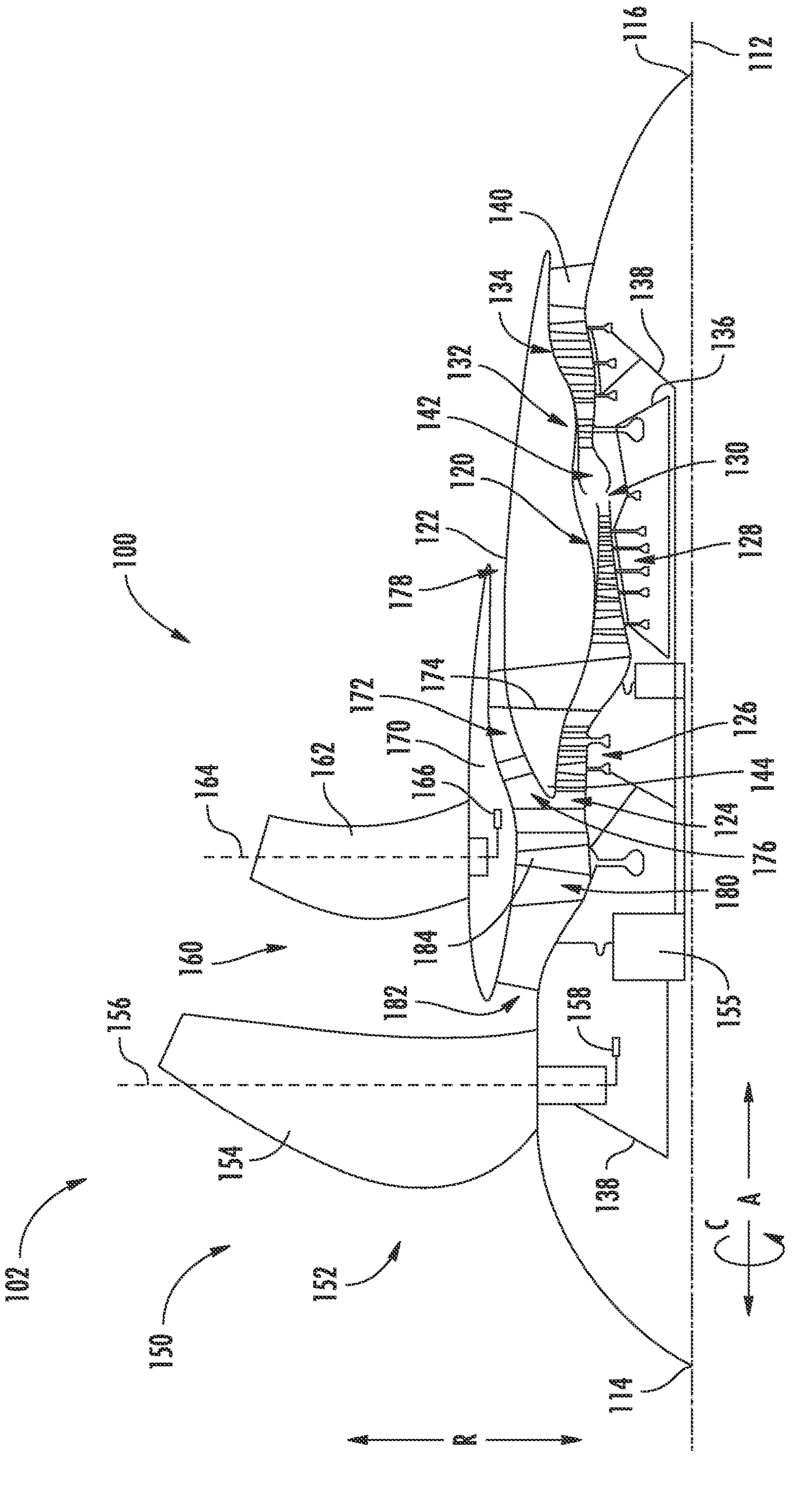
FIG. 1 is a schematic cross-sectional view of a gas turbine engine in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). The term "at least one of" in the context of, e.g., "at least one of A, B, and C" refers to only A, only B, only C, or any combination of A, B, and C. In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction.

The word “exemplary” is used herein to mean “serving as an example, instance, or illustration.” In addition, references to “an embodiment” or “one embodiment” does not necessarily refer to the same embodiment, although it may. Any implementation described herein as “exemplary” or “an embodiment” is not necessarily to be construed as preferred or advantageous over other implementations. Moreover, each example is provided by way of explanation of the disclosure, not limitation of the disclosure. In fact, it will be apparent to those skilled in the art that various modifications and variations can be made in the present disclosure without departing from the scope of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The terms “forward” and “aft” refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust. The terms “upstream” and “downstream” refer to the relative direction with respect to fluid flow in a fluid pathway. For example, “upstream” refers to the direction from which the fluid flows, and “downstream” refers to the direction to which the fluid flows.

As used herein, the term “first stream” or “free stream” refers to a stream that flows outside of the engine inlet and over a fan, which is unducted. Furthermore, the first stream is a stream of air that is free stream air. As used herein, the term “second stream” or “core stream” refers to a stream that flows through the engine inlet and the ducted fan and also travels through the core inlet and the core duct. As used herein, the term “third stream” or “mid-fan stream” refers to a stream that flows through an engine inlet and a ducted fan but does not travel through a core inlet and a core duct. Furthermore, the third stream is a stream of air that takes inlet air as opposed to free stream air. The third stream goes through at least one stage of the turbomachine, e.g., the ducted fan.

Thus, a third stream means a non-primary air stream capable of increasing fluid energy to produce a minority of total propulsion system thrust. A pressure ratio of the third stream is higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments, these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions. In other exemplary embodiments, it is contemplated that the airflow through the third stream may contribute greater than 50% of the total engine thrust (and at least, e.g., 2% of the total engine thrust) at an engine operating condition. In other exemplary embodiments, it is contemplated that the airflow through the third stream may contribute approximately 50% of the total engine thrust (and at least, e.g., 2% of the total engine thrust) at an engine operating condition.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

Aircraft engine components, such as fan blades, nacelles, guide vanes, etc., used in jet engine applications are susceptible to foreign object impact damage or ingestion events, such as an ice ingestion or bird strike. In addition, other routine wear or operating conditions can result in failure of fan blades. For example, conventional fan blades are susceptible for fan blade out (FBO) events resulting blade fracture, component delamination, bending or deformation damage, or other forms of blade damage. When a fan blade is broken off or liberated from the rotor, whether due to a bird strike or other blade wear, blade containment and damage reduction are important for the safety of aircraft passengers and continued operation of the gas turbine engine. Accordingly, improved airfoil designs for mitigating the effects of a FBO event and which provide for easier containment in the event of a blade failure would be useful. More specifically, an airfoil assembly with improved aeromechanics, durability, and safety would be particularly beneficial.

As explained herein, multi-segmented fan blades that include internal tensioning members may be used in gas turbine engines. For example, such fan blades may include a plurality of segments that are positioned radially adjacent to each other or stacked along the radial direction. The fan blade may include a plurality of tensioning strings that are embedded within or otherwise attached to one or more of the blade segments. These tensioning strings may be tensioned to firmly hold the blade segments together and form a solid blade structure. These fan blades may also include one or more tensioning retainers that are positioned at various radial locations to provide a rigid structure to which the tensioning strings may be attached.

Referring now to FIG. 1, a schematic cross-sectional view of a gas turbine engine 100 is provided according to an example embodiment of the present disclosure. Particularly, FIG. 1 provides an engine having a rotor assembly with a single stage of unducted rotor blades. In such a manner, the rotor assembly may be referred to herein as an “unducted fan,” or the entire gas turbine engine 100 may be referred to as an “unducted engine,” or an engine having an open rotor propulsion system 102. In addition, the engine of FIG. 1 includes a mid-fan stream extending from the compressor section to a rotor assembly flowpath over the turbomachine, as will be explained in more detail below. It is also contemplated that, in other exemplary embodiments, the present disclosure is compatible with an engine having a duct around the unducted fan. It is also contemplated that, in other exemplary embodiments, the present disclosure is compatible with a turbofan engine having a third stream as described herein.

For reference, the gas turbine engine 100 defines an axial direction A, a radial direction R, and a circumferential direction C. Moreover, the gas turbine engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The gas turbine engine 100 extends between a forward end 114 and an aft end 116, e.g., along the axial direction A.

The gas turbine engine 100 includes a turbomachine 120, also referred to as a core of the gas turbine engine 100, and a rotor assembly, also referred to as a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air and produce high energy combustion products.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a core or turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. The fan 152 can be directly coupled with the LP shaft 138, e.g., in a direct-drive configuration. However, for the embodiments shown in FIG. 1, the fan 152 is coupled with the LP shaft 138 via a speed reduction gearbox 155, e.g., in an indirect-drive or geared-drive configuration.

Moreover, the fan blades 154 can be arranged in equal spacing around the longitudinal axis 112. Each fan blade 154 has a root and a tip and a span defined therebetween. Each fan blade 154 defines a central blade axis 156. For this embodiment, each fan blade 154 of the fan 152 is rotatable about their respective central blade axis 156, e.g., in unison with one another. One or more actuators 158 are provided to facilitate such rotation and therefore may be used to change a pitch the fan blades 154 about their respective central blade axis 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about their respective central blade axis 164, e.g., in unison with one another. One or more actuators 166 are provided to facilitate such rotation and therefore may be used to change a pitch of the fan guide vane 162 about their respective central blade axis 164. However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 is included aft of the fan 152, such that the gas turbine engine 100 includes both a ducted and an unducted fan which both serve to generate thrust through the movement of air without passage through at least a portion of the turbomachine 120 (e.g., the HP compressor 128 and combustion section for the embodiment depicted). The ducted fan is shown at about the same axial location as the fan blade 154, and radially inward of the fan blade 154. The ducted fan 184, for the embodiment depicted, is driven by the low pressure turbine 134 (e.g., coupled to the LP shaft 138).

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan flowpath or fan duct 172. The fan flowpath or fan duct 172 may be referred to as a third stream of the gas turbine engine 100.

Incoming air (e.g., free stream or first stream air) may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl.

The gas turbine engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a splitter or leading edge 144 of the core cowl 122. The inlet duct 180 is wider than the core duct 142 along the radial direction R. The inlet duct 180 is also wider than the fan duct 172 along the radial direction R.

Referring now generally to FIGS. 2 through 13, airfoil assemblies that may be used in a gas turbine engine will be described according to exemplary embodiments of the present subject matter. Specifically, these figures provide schematic illustrations of airfoil assemblies 200 that may be used in gas turbine engine 100, e.g., as fan blade 154 or as fan guide vanes 162. Notably, due to the similarity between embodiments described herein, like reference numerals may be used to refer to the same or similar features among various embodiments. Although airfoil assemblies 200 are described herein as being used with gas turbine engine 100, it should be appreciated that aspects of the present subject matter may be applicable to any suitable blades for any suitable gas turbine engine. Indeed, the exemplary blade constructions and features described herein may be interchangeable among embodiments to generate additional exemplary embodiments. The specific structures illustrated and described herein are only exemplary and are not intended to limit the scope of the present subject matter in any manner.

It should be appreciated that airfoil assembly 200 is only illustrated schematically herein to facilitate discussion of aspects of the present subject matter. Accordingly, airfoil assembly 200 may take any other suitable shape and may include any other suitable features according to alternative embodiments. For example, airfoil assembly 200 may include any suitable blade attachment structure (not shown), e.g., such as a dovetail for securing airfoil assembly 200 to a rotating central hub (e.g., or mechanically coupling airfoil assemblies 200 to actuators 158). Other modified blade constructions are possible and within the scope of the present subject matter.

In general, airfoil assembly 200 extends along a first direction, e.g., the radial direction R (e.g., perpendicular to the axial direction A of gas turbine engine 100) as illustrated in the figures. Specifically, airfoil assembly 200 extends along the radial direction R from a root 202 of airfoil assembly 200 outward along the radial direction R toward a tip 204 of airfoil assembly 200.

In addition, as shown for example in FIG. 8, airfoil assembly 200 may further include a blade skin 206 that is generally positioned or wrapped around the internal structure of airfoil assembly 200 (described below) to define an airfoil 208. Blade skin 206 is not illustrated in the remaining figures for the purpose of clarity, but it should be appreciated that some or all airfoil assemblies 200 may include blade skin 206. Blade skin 206 may be a polymer matrix composite (PMC), epoxy resin, carbon fiber, glass fiber, thermoplastics material, etc. As used herein, the term "airfoil" may generally refer to the shape or geometry of an outer surface of airfoil assembly 200, e.g., the surface that interacts with the stream of air passing over airfoil assembly 200.

In general, airfoil 208 has a pressure side 210 and a suction side 212 extending in the axial direction A between a leading edge 214 (e.g., a forward end of airfoil 208) and a trailing edge 216 (e.g., an aft end of airfoil 208). In addition, a chord line (not labeled) may be generally defined as a line extending between leading edge 214 and trailing edge 216, and the term "chordwise direction" may generally refer to the relative position along the chord line. Airfoil 208 may further define a camber line 218 that lies halfway between pressure side 210 and suction side 212, intersecting the chord line at leading edge 214 and trailing edge 216. In addition, a span 220 of airfoil assembly 200 may be generally defined as the distance between root 202 and tip 204 of airfoil assembly 200 as measured along the radial direction R, and the term "spanwise direction" may generally refer to relative position along span 220.

According to exemplary embodiments of the present subject matter, airfoil assembly 200 may generally include a plurality of blade segments (e.g., identified generally by reference numeral 230) that are joined together by a tensioning assembly (e.g., identified generally by reference numeral 232). In this regard, blade segments 230 are positioned adjacent to each other and tensioning assembly 232 is generally configured for joining, binding, or otherwise coupling blade segments 230 together to form a rigid airfoil assembly 200.

Notably, by forming airfoil assembly 200 out of multiple blade segments 230, the aerodynamic profile of airfoil assembly 200 may be designed for any suitable application and for improved aerodynamics. In this regard, each portion of the blade maybe carefully designed and manufactured for optimal aerodynamics and the blade segments 230 may be joined as a single airfoil assembly 200 using tensioning assembly 232 and/or other attachment structures/materials (e.g., such as overlapping joints, adhesives, etc.). In addition, airfoil assembly 200 may be a durable assembly that does not suffer from delamination and which has extended blade life or aeromechanics performance.

Moreover, in the event that airfoil assembly 200 fails for any reason (e.g., such as bird strike or prolonged wear), the damage arising from a blade failure or a fan blade out (FBO) event may be mitigated. In this regard, failure is most likely to occur to one portion of blade segment 230 of airfoil assembly 200, such that a smaller portion of the blade is ingested into the gas turbine engine 100. Even in the event of a full failure of airfoil assembly 200, blade segments 230 are likely to separate and result in smaller pieces of material or blade fragments flowing downstream. Similarly, in the event of a fan blade failure, blade containment may be more manageable, as smaller blade fragments are being liberated from the rotor. In addition, the segmentation of blades may result in simpler manufacturing due to the shorter blades.

Figure 2:
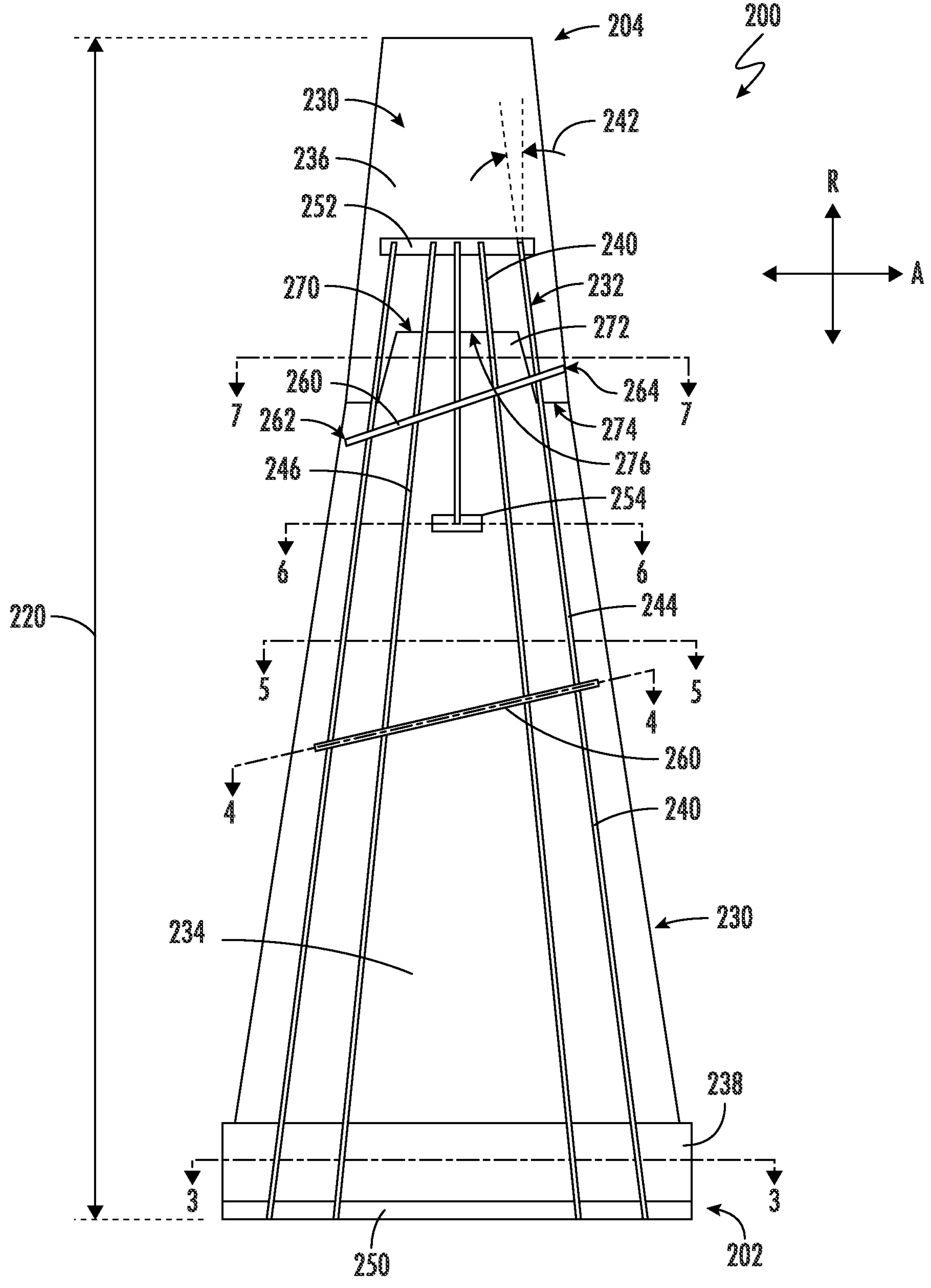
FIG. 2 is a schematic cross-sectional view of an airfoil assembly that may be used with the exemplary gas turbine engine of FIG. 1 in accordance with an exemplary embodiment of the present disclosure.
Figure 3:
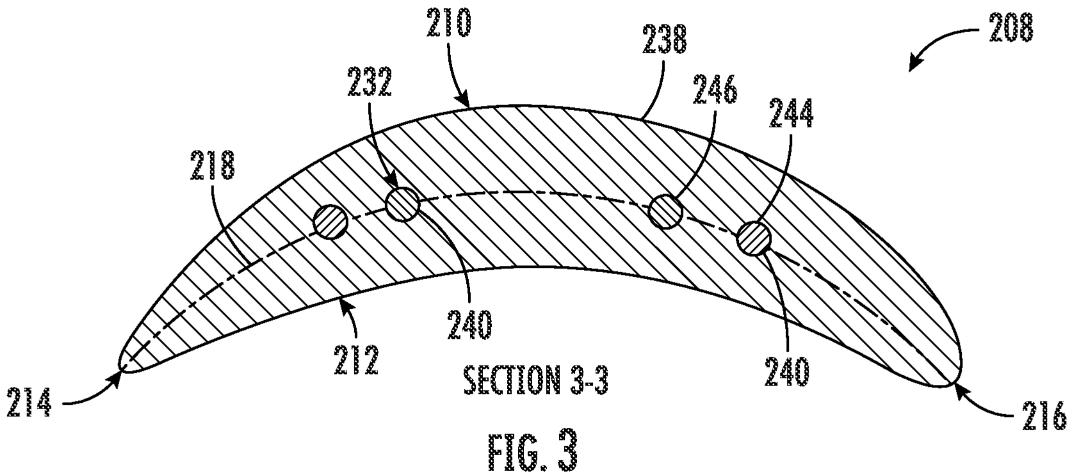
FIG. 3 is a schematic cross-sectional view of the exemplary airfoil assembly of FIG. 2 taken along Line 3-3 in accordance with an exemplary embodiment of the present disclosure.

Referring now specifically to the embodiment illustrated in FIG. 2, airfoil assembly 200 may include two blade segments 230. In this regard, blade segments 230 may include a first blade segment 234 that is positioned proximate root 202 of airfoil assembly 200. A second blade segment 236 may be positioned adjacent the first blade segment 234 along the radial direction R, e.g., proximate tip 204 of airfoil assembly 200. Tensioning assembly 232 may extend between and mechanically couple first blade segment 234 and second blade segment 236 such that airfoil assembly 200 acts as a single rigid body even under forces resulting from high engine speeds.

Although the embodiments illustrated herein only include two blade segments 230, it should be appreciated that airfoil assembly 200 may include any suitable number, type, and position of blade segments 230 while remaining within the scope of the present subject matter. According to such embodiments, tensioning assembly 232 may vary as needed in order to bind some or all of blade segments 230 together to form the airfoil assembly 200. For example, blade segments 230 may include a third blade segment positioned between first blade segment 234 and second blade segment 236 along the radial direction R, and wherein the tensioning assembly 232 passes through the third blade segment.

In addition, it should be appreciated that blade segments 230 may each be formed from any suitable materials or compositions. For example, according to an exemplary embodiment, first blade segment 234 may be formed from a material providing high stiffness for strength and durability. By contrast, according to an example embodiment, second blade segment 236 may be designed using a rub tolerant material and from a material that facilitates safe liberation in case of excessive impact loads or failure of second blade segment 236. Accordingly to alternative embodiments, first blade segment 234 and second blade segment 236 may be formed from the same material but may have a different construction, thickness, etc.

As best illustrated in FIGS. 2 and 8 through 12, airfoil assembly 200 may further include a disc 238 positioned proximate root 202 of airfoil assembly 200. Specifically, as illustrated, first blade segment 234 may be seated directly on disc 238, which is a rigid structure forming a solid base for airfoil assembly 200. According to exemplary embodiments, disc 238 may be directly coupled to or may otherwise define a blade attachment structure, such as a dovetail.

According to the illustrated embodiment, tensioning assembly 232 may generally include a plurality of tensioning strings 240 that extend between and mechanically couple various blade segments 230. It should be appreciated that tensioning strings 240 may be formed from any suitable material, such as wire, rope, cable, or any other elongated connector formed from any suitably rigid material having a high tensile strength, such as metal. According to exemplary embodiments, tensioning strings 240 may include twisted or braided strands of metal wire. Other suitable materials are possible and within the scope of the present subject matter. According to the embodiment illustrated in FIG. 2, tensioning assembly 232 includes five tensioning strings 240 that are spaced equidistantly along camber line 218. However, it should be appreciated that tensioning assembly 232 may include any suitable number and spacing of tensioning strings 240, e.g., as illustrated for example in FIGS. 8 through 12.

According to the illustrated embodiment, tensioning strings 240 generally extend along the radial direction R between first blade segment 234 and second blade segment 236. For example, as shown for example in FIGS. 8 through 10, one or more of tensioning strings 240 may extend in a direction parallel to the radial direction R. According to still other embodiments, e.g., as shown in FIG. 2, tensioning strings 240 may extend at an angle 242 measured relative to the radial direction R. In this regard, for example, the angle 242 of tensioning strings 240 may generally vary between 0° and 90°, between 2° and 60°, between 4° and 45°, between 6° and 30°, between 8° and 15°, or about 10°. Other suitable string angles 242 are possible and within scope the present subject matter.

In general, tensioning strings 240 may be spaced apart within airfoil assembly 200 in any suitable manner, e.g., for supporting structural loads at desired locations and forming a rigid blade. For example, referring now briefly to FIGS. 3 through 7, tensioning strings 240 may generally be spaced apart within airfoil 208. In this regard, for example, tensioning strings 240 may be spaced apart along camber line 218 of airfoil 208, e.g., such that the load is distributed evenly between leading edge 214 and trailing edge 216 of airfoil 208.

In addition, as shown schematically in the figures, tensioning strings 240 may generally include one or more outer strings 244 positioned proximate leading edge 214 and/or trailing edge 216 of airfoil assembly 200. In this regard, for example, outer strings 244 may be made from low alpha materials which are relatively insensitive to temperature variations. In addition, tensioning strings 240 may include one or more core strings 246 that are positioned between the one or more outer strings 244 within airfoil assembly 200. According to exemplary embodiments, outer strings 244 may be formed from a different material or may have a different construction than core strings 246. For example, according to exemplary embodiments, core strings 246 may be made with high-strength materials that are designed to withstand excessive impact loads. It should be appreciated that there may be other types of tensioning strings 240 positioned at any suitable location within airfoil assembly 200 while remaining within the scope of the present subject matter. Moreover, although the figures illustrate outer strings 244 positioned at both leading edge 214 and trailing edges 216, it should be appreciated that one or both of these outer strings 244 may be replaced by core strings 246 or any other suitable tensioning strings 240.

Tensioning strings 240 may generally be secured, embedded, or otherwise attached to blade segments 230 in any suitable manner. For example, ends or any intermediate portions of each tensioning string 240 may be bonded to blade segments 230 in any suitable manner, e.g., such as using an adhesive, crimping, tying off, or otherwise joining tensioning strings 240 to blade segments 230. In addition, it should be appreciated that tensioning strings 240 may be pretensioned by an amount desirable for ensuring that blade segments 230 remain in contact even during high-speed engine operation. In this manner, tensioning assembly 232 may carry bending and tension loads. In addition, torsional loads may be carried by blade segments 230 due to their close tolerance and tight interface achieved by pretensioned tensioning strings 240 and due to their complementary engagement surfaces (described below).

According to exemplary embodiments, tensioning assembly 232 may include one or more tensioning retainers that are positioned adjacent and seated against blade segments 230 for providing a rigid structure to which tensioning strings 240 may be attached and pretensioned. In this regard, referring again to FIG. 2, tensioning assembly 232 may further include an inner tensioning retainer 250 that is positioned proximate root 202 of airfoil assembly 200 such that first blade segment 234 is positioned between inner tensioning retainer 250 and the second blade segment 236 along the radial direction R. As illustrated, some or all of the plurality of tensioning strings 240 may pass through first blade segment 234 and may be anchored or otherwise attached to inner tensioning retainer 250. In general, inner tensioning retainer 250 may be formed from a more rigid structure than blade segments 230, such as a plate of steel or other suitably rigid material.

Figure 9:
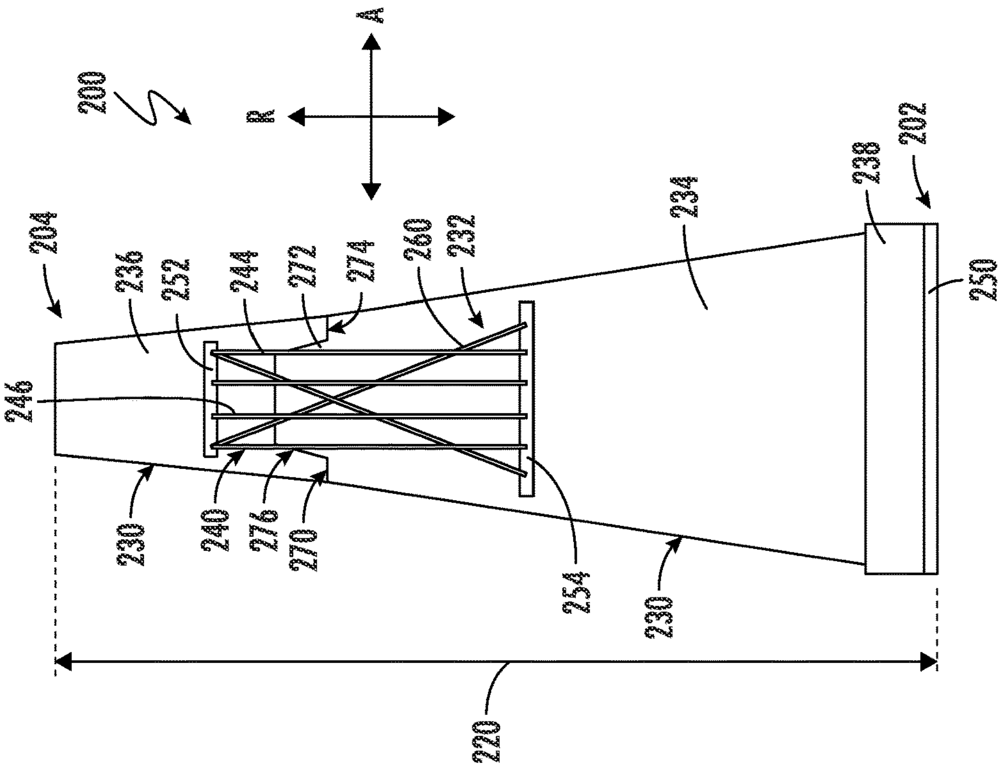
FIG. 9 is a schematic cross-sectional view of an airfoil assembly that may be used with the exemplary gas turbine engine of FIG. 1 in accordance with another exemplary embodiment of the present disclosure.
Figure 8:
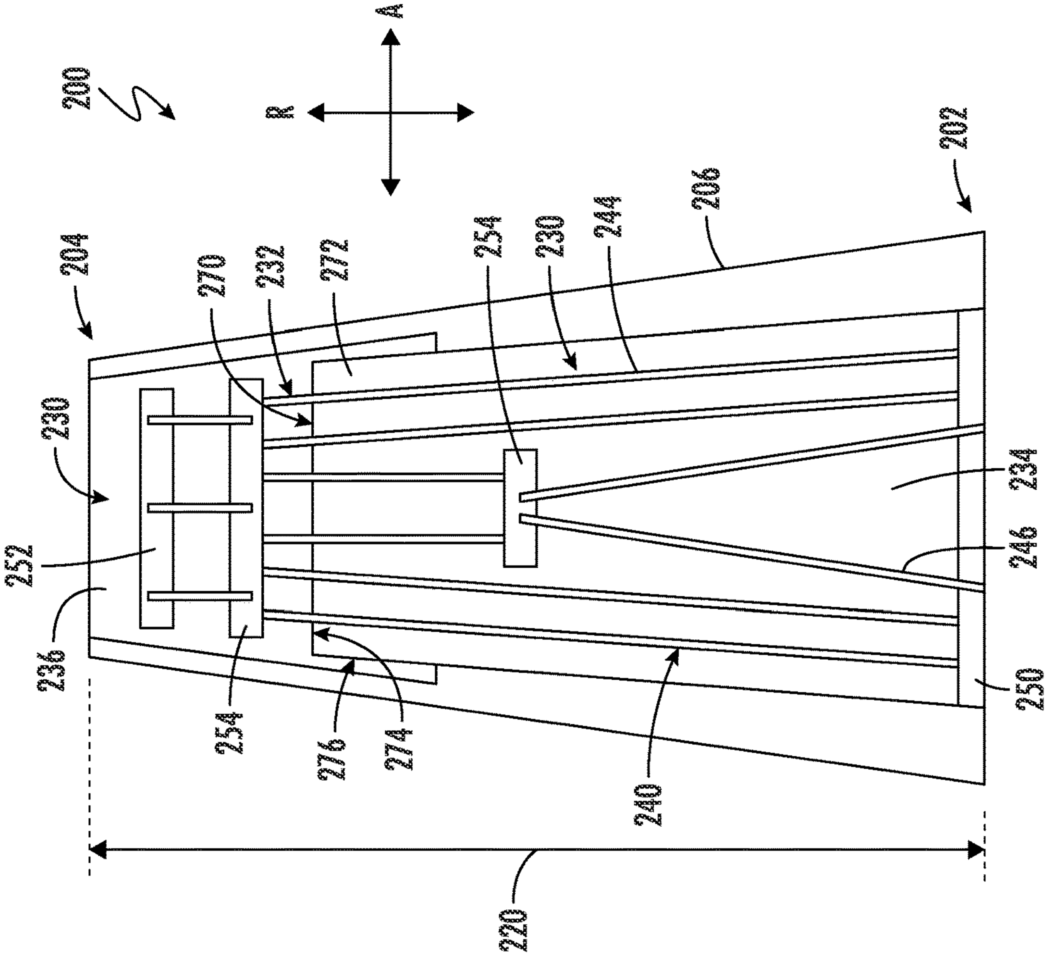
FIG. 8 is a schematic cross-sectional view of an airfoil assembly that may be used with the exemplary gas turbine engine of FIG. 1 in accordance with another exemplary embodiment of the present disclosure.
Figure 11:
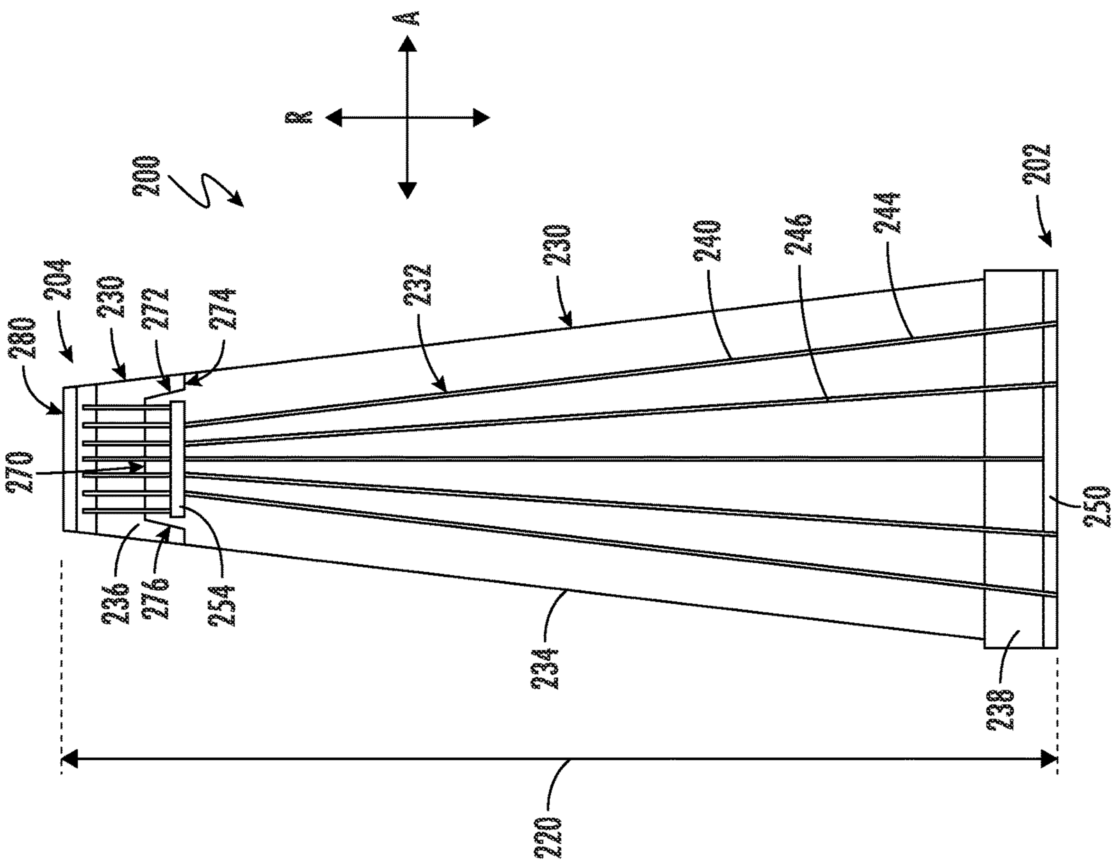
FIG. 11 is a schematic cross-sectional view of an airfoil assembly that may be used with the exemplary gas turbine engine of FIG. 1 in accordance with another exemplary embodiment of the present disclosure.
Figure 10:
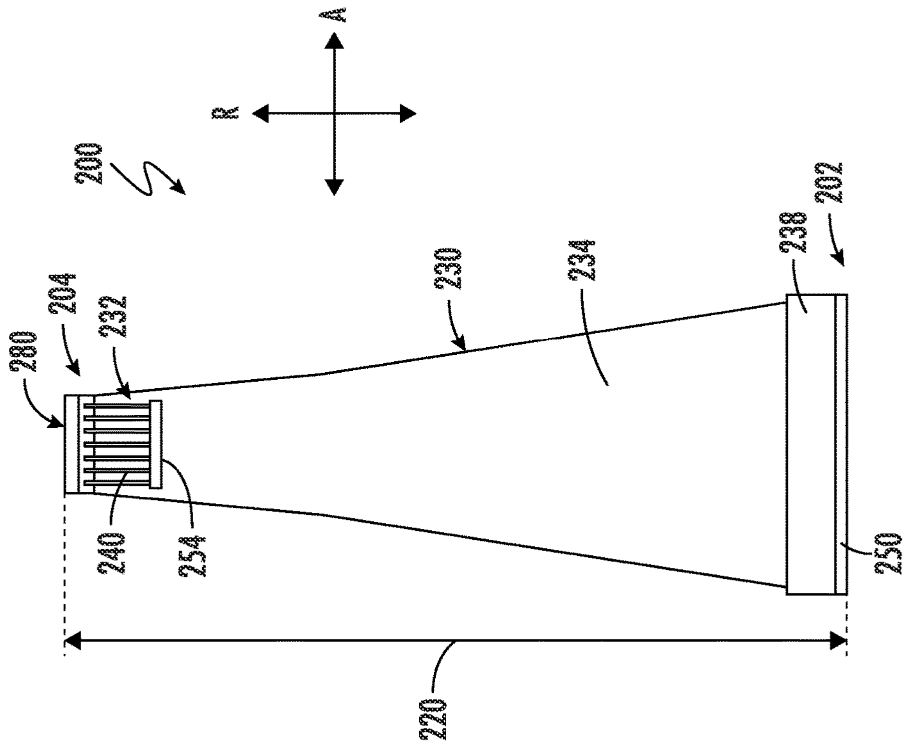
FIG. 10 is a schematic cross-sectional view of an airfoil assembly that may be used with the exemplary gas turbine engine of FIG. 1 in accordance with another exemplary embodiment of the present disclosure.
Figure 12:
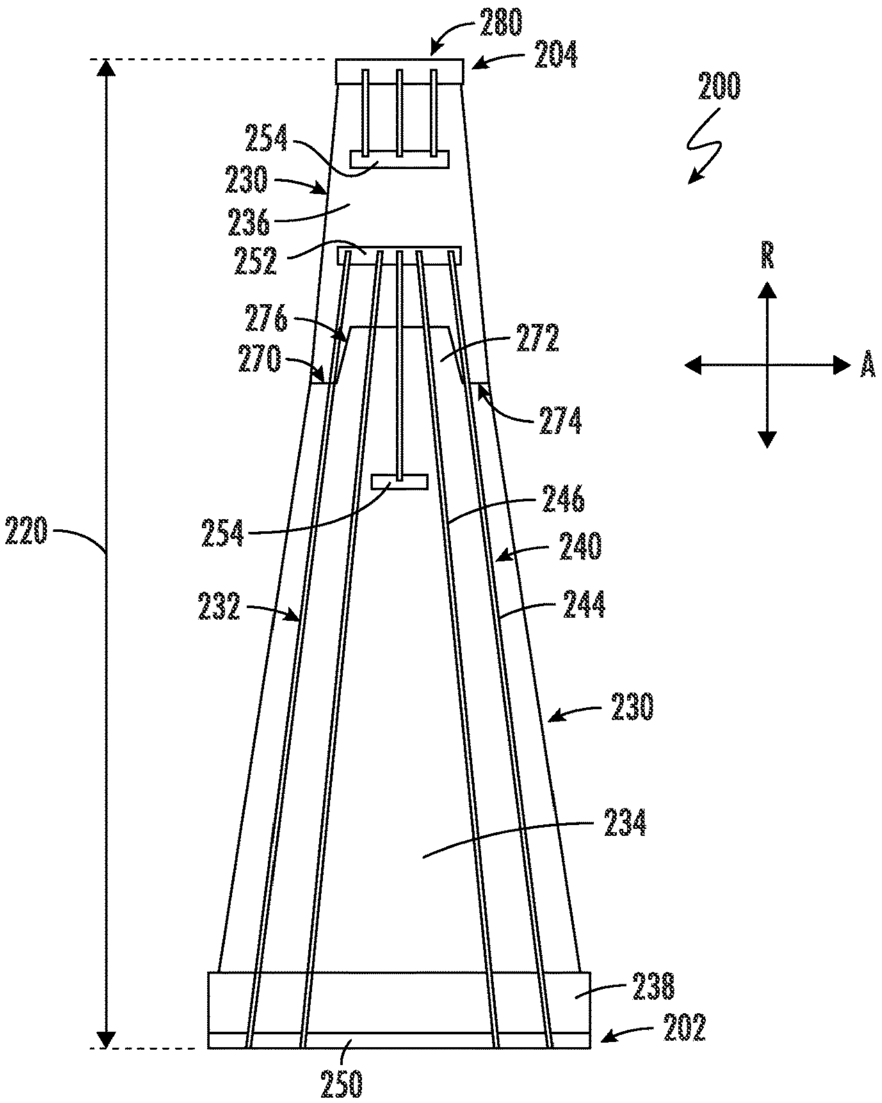
FIG. 12 is a schematic cross-sectional view of an airfoil assembly that may be used with the exemplary gas turbine engine of FIG. 1 in accordance with another exemplary embodiment of the present disclosure.
Figure 13:
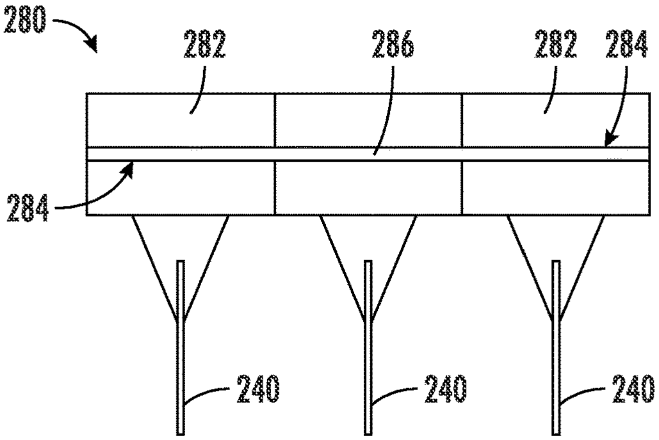
FIG. 13 is a close-up schematic cross-sectional view of a tip of the exemplary airfoil assembly of FIG. 12 in accordance with an exemplary embodiment of the present disclosure.

As best illustrated in FIGS. 8 and 9, tensioning assembly 232 may further include an outer tensioning retainer 252 that is embedded within the blade segment located proximate tip 204 of airfoil assembly 200. More specifically, according to the illustrated embodiment, outer tensioning retainer 252 is embedded within second blade segment 236 and some or all of tensioning strings 240 are anchored to outer tensioning retainer 252. In addition, tensioning assembly 232 may further include one or more intermediate tensioning retainers 254 that are positioned within either first blade segment 234 or second blade segment 236 between inner tensioning retainer 250 and outer tensioning retainer 252 to provide an anchor point for one or more tensioning strings 240.

In general, tensioning retainers 250, 252, 254 may extend substantially along the axial direction A and tensioning strings 240 may be connected to any combination of tensioning retainers 250, 252, 254, e.g., for supporting the necessary loading of airfoil assemblies 200. For example, as illustrated, some tensioning strings 240 may extend only between inner tensioning retainer 250 and intermediate tensioning retainer 254, while other tensioning strings 240 may extend only between intermediate tensioning retainer 254 and outer tensioning retainer 252. In addition, or alternatively, some tensioning strings 240 may extend only between inner tensioning retainer 250 and outer tensioning retainer 252, e.g., thus bypassing intermediate tensioning retainer 254. It should be appreciated that the number, size, position, and orientation of tensioning retainers may vary while remaining within the scope of the present subject matter.

Figure 4:
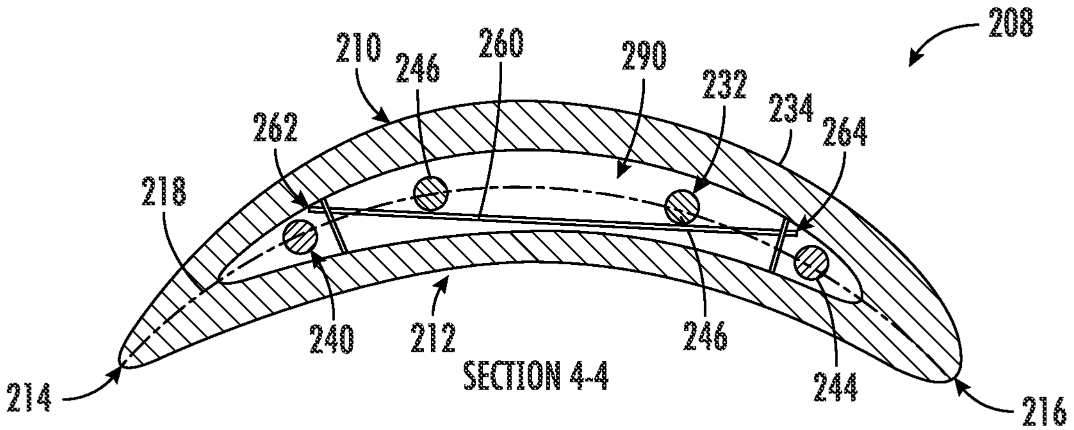
FIG. 4 is a schematic cross-sectional view of the exemplary airfoil assembly of FIG. 2 taken along Line 4-4 in accordance with an exemplary embodiment of the present disclosure.
Figure 5:
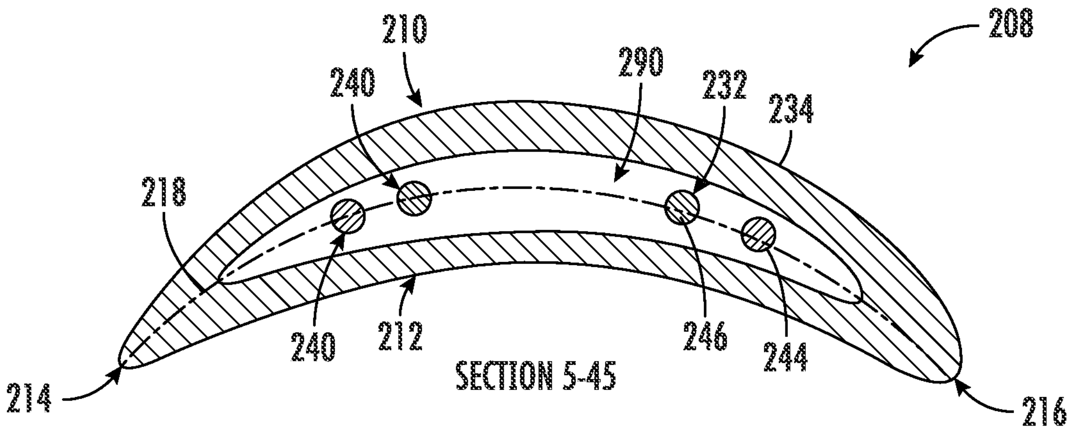
FIG. 5 is a schematic cross-sectional view of the exemplary airfoil assembly of FIG. 2 taken along Line 5-5 in accordance with an exemplary embodiment of the present disclosure.
Figure 6:
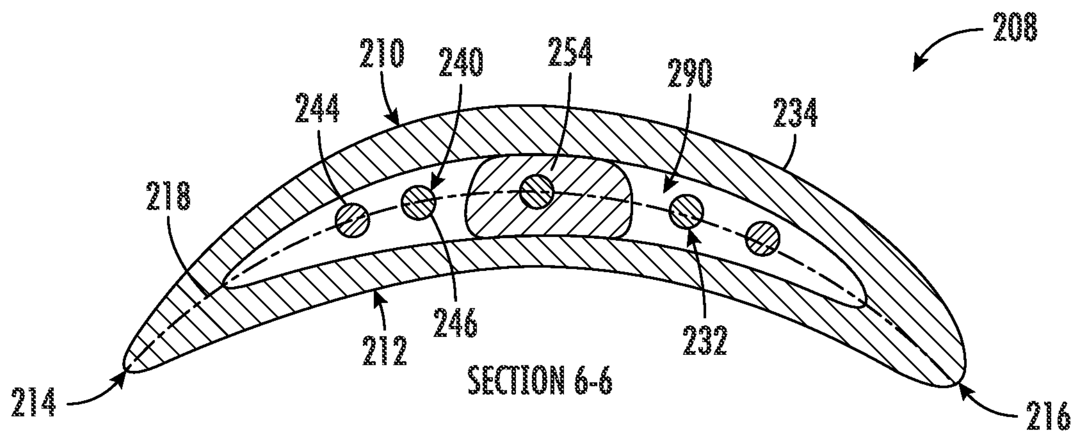
FIG. 6 is a schematic cross-sectional view of the exemplary airfoil assembly of FIG. 2 taken along Line 6-6 in accordance with an exemplary embodiment of the present disclosure.
Figure 7:
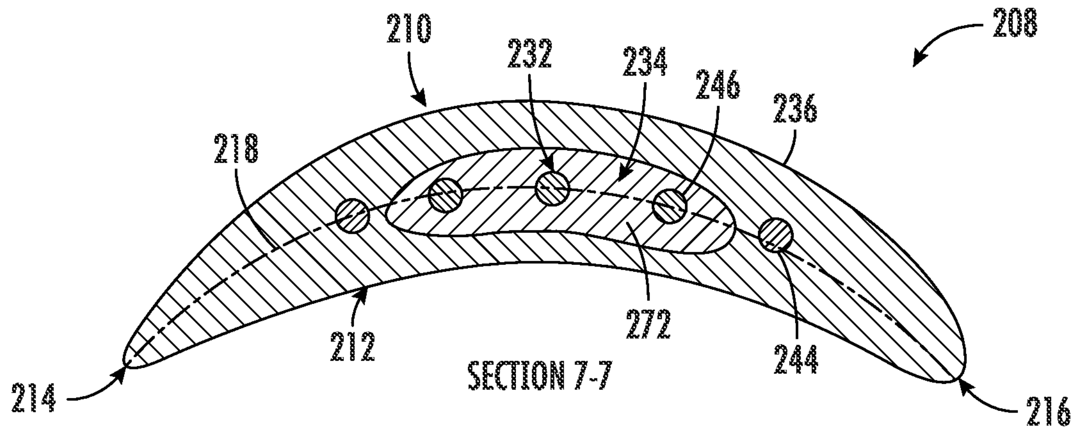
FIG. 7 is a schematic cross-sectional view of the exemplary airfoil assembly of FIG. 2 taken along Line 7-7 in accordance with an exemplary embodiment of the present disclosure.

Referring now specifically to FIGS. 2 and 4, tensioning assembly 232 may further include one or more side strings 260 that generally extend across airfoil assembly 200, e.g., in the axial direction A. For example, according to the illustrated embodiment, side strings 260 may extend between leading edge 214 and trailing edge 216 of airfoil assembly 200. In general, side strings 260 may be positioned and oriented for limiting torsional stresses on airfoil assembly 200 and otherwise ensuring that tensioning strings 240 remain properly positioned. Side strings 260 may generally have a similar construction to tensioning strings 240 except that they extend axially, across airfoil 208 of airfoil assembly 200.

Side strings 260 may be attached or embedded within blade segments 230 in any suitable manner. For example, side strings 260 may be attached to one or more of tensioning strings 240. For example, according to exemplary embodiments, side strings 260 may extend only within a single blade segment 230. By contrast, according to the illustrated embodiment of FIG. 2, side strings 260 may have a first end 262 positioned within first blade segment 234 and a second end 264 positioned within second blade segment 236 (e.g., side strings 260 may cross over and join the adjacent blade segments 230). In addition, it should be appreciated that side strings 260 may be directly coupled to, wrapped or wound around, crimped to, or otherwise attached to tensioning strings 240 to provide a stronger, more rigid airfoil assembly 200. In addition, according to example embodiments, side strings 260 may be joined to one or more tensioning retainers 250, 252, 254.

In addition, according to exemplary embodiments, multiple side strings 260 may be interwoven or otherwise joined to provide additional structural support to airfoil assembly 200, e.g., particularly around the joint where first blade segment 234 and second blade segment 236 meet. For example, multiple side strings 260 may extend in any suitable directions to form any suitable structure, such as a spoke structure, a mesh structure, or any other suitable geometry for improving the rigidity and structure of airfoil assembly 200.

As shown in FIGS. 2, 8, 9, 11, and 12, blade segments 230 may further define engagement features for ensuring secure engagement and cooperation between adjacent blade segments 230. In this regard, according to the illustrated embodiments, an outer radial end 270 of first blade segment 234 may define a locking protrusion 272. In addition, second blade segment 236 may include an inner radial end 274 that defines a complimentary recess 276. In general, locking protrusion 272 has a shape, size, and geometry that is complementary to complimentary recess 276. In this manner, when first blade segment 234 and second blade segment 236 are stacked against each other, locking protrusion 272 may be securely received within complimentary recess 276. The engagement between these two engagement features provides strong engagement between adjacent blade segments 230, especially when placed under tension using tensioning assembly 232. According to exemplary embodiments, outer radial end 270 and inner radial end 274 may also have an adhesive applied for assembly for strong engagement between blade segments 230. In addition, it should be appreciated that locking protrusion 272 and complimentary recess 276 may be swapped, e.g., with locking protrusion being defined by second blade segment 236 and complimentary recess 276 being defined by first blade segment 234, while remaining within the scope of the present subject matter.

Referring now specifically to FIGS. 10 through 13, airfoil assembly 200 may further include a frangible blade tip 280 is positioned at the tip 204 of airfoil assembly 200. In general, frangible blade tip 280 may be any suitable structure that may rotate close to a fan casing or outer boundary while reducing the severity of damage in the event of a blade rub or contact with the outer casing occurs. In this regard, frangible blade tip 280 may be designed to break away easily without full destruction of airfoil assembly 200. In addition, frangible blade tip 280 may be made from brittle materials that are not likely to damage downstream portions of gas turbine engine 100 (FIG. 1). According to an example embodiment illustrated in FIG. 10, frangible blade tip 280 may be directly mounted to first blade segment 234 (e.g., second blade segment 236 may be omitted) and tensioning assembly 232 may be used to secure first blade segment 234 and frangible blade tip 280.

According to the illustrated embodiment, frangible blade tip 280 may be joined to second blade segment 230 using any suitable adhesive or attachment structure. For example, tensioning assembly 232 may include tensioning strings 240 that extend toward and are attached to frangible blade tip 280. More specifically, according to the illustrated embodiment, frangible blade tip 280 may be formed from a plurality of adjacently positioned tip segments 282. Each of these tip segments 282 may be secured to airfoil assembly 200 using a separate tensioning string 240. In addition, each of these tip segments 282 may define a central aperture 284 that are aligned with each other along the axial direction A. In this regard, a dowel 286 may be passed through apertures 284 of tip segments 282 to form a single frangible blade tip 280. Notably, however, the failure of one tip segment 282 may not necessarily result in the failure of the remaining tip segments 282.

According to example embodiments, one or more voids 290 (FIGS. 4 through 6) maybe defined within airfoil assembly 200 and may be filled with a support structure, e.g., for improved rigidity, reduced vibration, noise reduction, etc. For example, voids 290 or cavities may be filled with a lightweight foam or other suitable filler materials or compositions. According to exemplary embodiments, this foam may include at least one of polymethacrylimide (PMI) foam or a urethane foam. In addition, or alternatively, this foam may also include cast syntactic or expanding syntactic foams, e.g., glass, carbon, or phenolic micro balloons cast in resin. Other suitable foams are possible and within the scope of the present subject matter.

Figure 14:
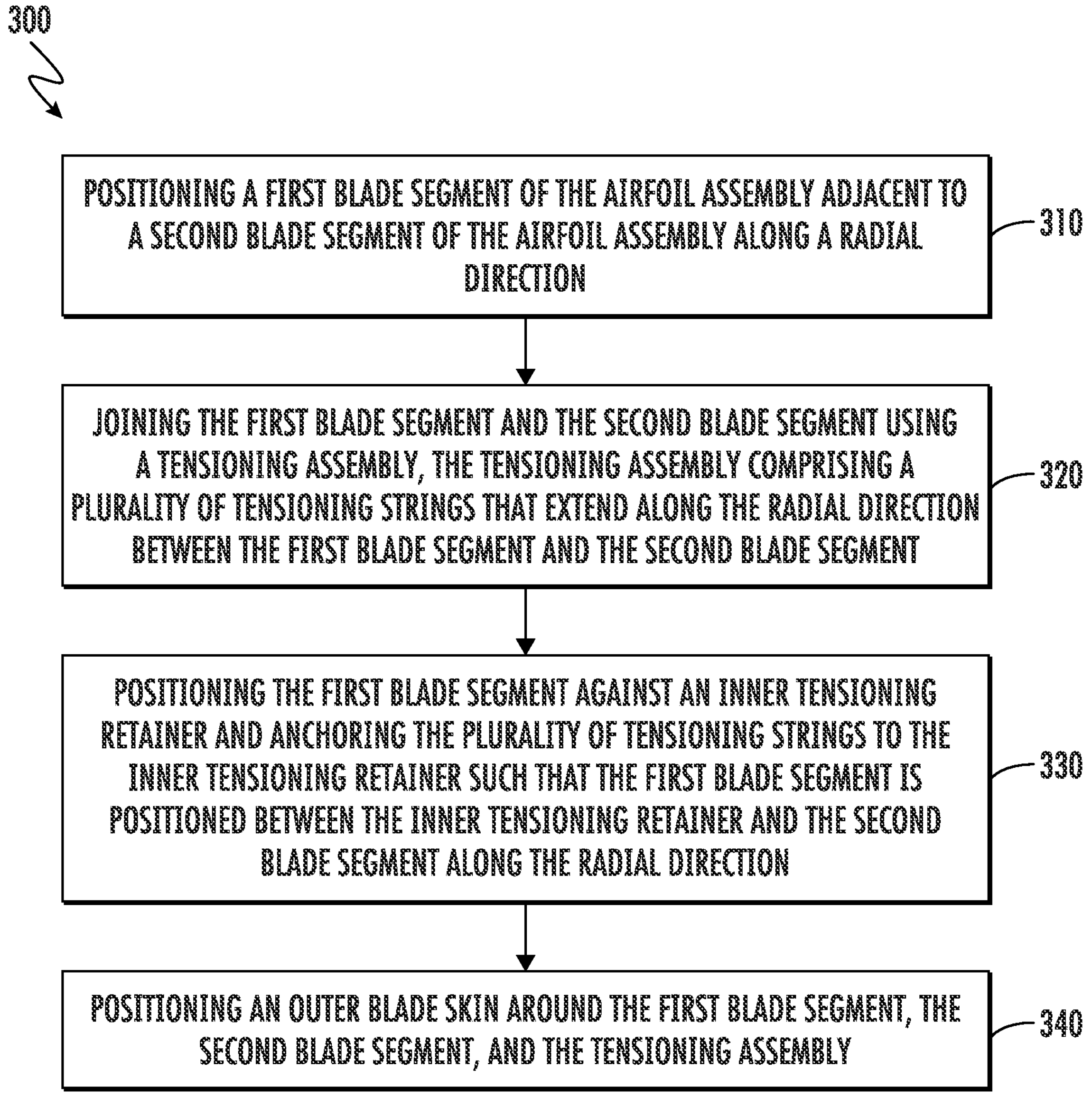
FIG. 14 provides a flowchart diagram of an exemplary method of manufacturing an airfoil assembly in accordance with an exemplary embodiment of the present disclosure.

Referring now to FIG. 14, an exemplary method 300 for constructing an airfoil assembly will be described according to exemplary embodiments of the present subject matter. For example, method 300 may be used to construct airfoil assembly 200 as described above. However, it should be appreciated that aspects of method 300 may be applied to the construction of any other suitable airfoil. In addition, it should be appreciated that alterations and modifications may be made to method 300 while remaining within scope of the present subject matter.

Method 300 may include, at step 310, positioning a first blade segment of the airfoil assembly adjacent to a second blade segment of the airfoil assembly along the radial direction. In this regard, a technician made layup the segments of the airfoil assembly by stacking or positioning the segments in their assembled positions. Notably, the step may also include application of any suitable adhesive or attachment structures, as well as seating of engagement surfaces. For example, this may include positioning locking protrusions 272 within complementary recesses 276, as described above.

Step 320 may generally include joining the first blade segment and the second blade segment using a tensioning assembly. For example, continuing the example from above, the tensioning assembly may include a plurality of tensioning strings that extend along the radial direction between the first blade segment and the second blade segment. These tensioning strings may be attached to the blade segments and may be pretensioned in order to form the airfoil assembly. Specifically, these tensioning strings may act as pretensioned damping elements and may serve to fuse the blade architecture to ensure safe operation under an excessive impact load.

According to an exemplary embodiment, step 330 may further include positioning the first blade segment against an inner tensioning retainer and anchoring one or more of the tensioning strings to the inner tensioning retainer such that the first blade segment is positioned between the inner tensioning retainer and the second blade segment along the radial direction. In addition, as described above, step 330 may include positioning and securing of one or more intermediate or outer tensioning retainers.

After the blade segments in the tensioning assembly are fully secured, step 340 may generally include positioning an outer blade skin around the first blade segment, the second blade segment, and the tensioning assembly. In general, the outer blade skin defines the outer profile of the airfoil and directly engages with the free air stream.

FIG. 14 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 300 are explained using airfoil assembly 200 as an example, it should be appreciated that this method may be applied to the construction of any other suitable airfoil for any other suitable application.

Further aspects are provided by the subject matter of the following clauses:

An airfoil assembly extending along a radial direction between a root and a tip, the airfoil assembly comprising: a first blade segment positioned proximate the root of the airfoil assembly; a second blade segment positioned adjacent the first blade segment along the radial direction; and a tensioning assembly comprising a plurality of tensioning strings that extend between and mechanically couple the first blade segment and the second blade segment.

The airfoil assembly of any preceding clause, wherein the plurality of tensioning strings is spaced apart along a camber line of the airfoil assembly.

The airfoil assembly of any preceding clause, wherein the plurality of tensioning strings comprises twisted or braided strands.

The airfoil assembly of any preceding clause, wherein the plurality of tensioning strings comprises: one or more outer strings positioned proximate a leading edge and a trailing edge of the airfoil assembly; and one or more core strings positioned between the one or more outer strings within the airfoil assembly, wherein the one or more outer strings are formed from a different material or have a different construction than the one or more core strings.

The airfoil assembly of any preceding clause, wherein at least one of the plurality of tensioning strings extends at an angle relative to the radial direction.

The airfoil assembly of any preceding clause, wherein the tensioning assembly further comprises: an inner tensioning retainer positioned proximate the root of the airfoil assembly such that the first blade segment is positioned between the inner tensioning retainer and the second blade segment along the radial direction, wherein the plurality of tensioning strings is anchored to the inner tensioning retainer.

The airfoil assembly of any preceding clause, wherein the tensioning assembly further comprises: an outer tensioning retainer embedded within the second blade segment proximate the tip of the airfoil assembly, wherein the plurality of tensioning strings is anchored to the outer tensioning retainer.

The airfoil assembly of any preceding clause, wherein the tensioning assembly further comprises: an intermediate tensioning retainer positioned within the first blade segment or the second blade segment.

The airfoil assembly of any preceding clause, wherein the tensioning assembly further comprises: one or more side strings that extend between a leading edge and a trailing edge of the airfoil assembly.

The airfoil assembly of any preceding clause, wherein the one or more side strings are attached to the plurality of tensioning strings or are embedded in at least one of the first blade segment or the second blade segment.

The airfoil assembly of any preceding clause, wherein the one or more side strings are embedded entirely within the first blade segment or the second blade segment.

The airfoil assembly of any preceding clause, wherein at least one of the one or more side strings are attached to at least one of the inner tensioning retainer, the outer tensioning retainer, or the intermediate tensioning retainer.

The airfoil assembly of any preceding clause, wherein at least one of the one or more side strings has a first end positioned within the first blade segment and a second end positioned within the second blade segment.

The airfoil assembly of any preceding clause, wherein at least one of the plurality of tensioning strings extends between the inner tensioning retainer and the outer tensioning retainer.

The airfoil assembly of any preceding clause, wherein at least one of the plurality of tensioning strings extends between the intermediate tensioning retainer and at least one of the inner tensioning retainer or the outer tensioning retainer.

The airfoil assembly of any preceding clause, further comprising: a third blade segment positioned between the first blade segment and the second blade segment along the radial direction, wherein the tensioning assembly passes through the third blade segment.

The airfoil assembly of any preceding clause, wherein an outer radial end of the first blade segment defines a locking protrusion and an inner radial end of the second blade segment defines a complementary recess for receiving the locking protrusion of the first blade segment.

The airfoil assembly of any preceding clause, further comprising: a frangible blade tip positioned at the tip of the airfoil assembly, wherein the tensioning assembly is connected to the frangible blade tip.

The airfoil assembly of any preceding clause, wherein the frangible blade tip comprises a plurality of adjacently positioned tip segments.

The airfoil assembly of any preceding clause, wherein each of the plurality of tip segments define an aperture, and wherein a dowel passes through the aperture of each of the plurality of tip segments to join the plurality of tip segments.

The airfoil assembly of any preceding clause, further comprising: an outer blade skin positioned around the first blade segment, the second blade segment, and the tensioning assembly.

A method of manufacturing an airfoil assembly, the method comprising: positioning a first blade segment of the airfoil assembly adjacent to a second blade segment of the airfoil assembly along a radial direction; and joining the first blade segment and the second blade segment using a tensioning assembly, the tensioning assembly comprising a plurality of tensioning strings that extend along the radial direction between the first blade segment and the second blade segment.

The method of any preceding clause, further comprising: positioning the first blade segment against an inner tensioning retainer; and anchoring the plurality of tensioning strings to the inner tensioning retainer such that the first blade segment is positioned between the inner tensioning retainer and the second blade segment along the radial direction.

The method of any preceding clause, further comprising: positioning an outer blade skin around the first blade segment, the second blade segment, and the tensioning assembly.

The method of any preceding clause, wherein the plurality of tensioning strings is spaced apart along a camber line of the airfoil assembly.

The method of any preceding clause, wherein the plurality of tensioning strings comprises twisted or braided strands.

The method of any preceding clause, wherein the plurality of tensioning strings comprises: one or more outer strings positioned proximate a leading edge and a trailing edge of the airfoil assembly; and one or more core strings positioned between the one or more outer strings within the airfoil assembly, wherein the one or more outer strings are formed from a different material or have a different construction than the one or more core strings.

The method of any preceding clause, wherein at least one of the plurality of tensioning strings extends at an angle relative to the radial direction.

The method of any preceding clause, wherein the tensioning assembly further comprises: an outer tensioning retainer embedded within the second blade segment proximate the tip of the airfoil assembly, wherein the plurality of tensioning strings is anchored to the outer tensioning retainer.

The method of any preceding clause, wherein the tensioning assembly further comprises: an intermediate tensioning retainer positioned within the first blade segment or the second blade segment.

The method of any preceding clause, wherein the tensioning assembly further comprises: one or more side strings that extend between a leading edge and a trailing edge of the airfoil assembly.

The method of any preceding clause, wherein the one or more side strings are attached to the plurality of tensioning strings or are embedded in at least one of the first blade segment or the second blade segment.

The method of any preceding clause, wherein the one or more side strings are embedded entirely within the first blade segment or the second blade segment.

The method of any preceding clause, wherein at least one of the one or more side strings are attached to at least one of the inner tensioning retainer, the outer tensioning retainer, or the intermediate tensioning retainer.

The method of any preceding clause, wherein at least one of the one or more side strings has a first end positioned within the first blade segment and a second end positioned within the second blade segment.

The method of any preceding clause, wherein at least one of the plurality of tensioning strings extends between the inner tensioning retainer and the outer tensioning retainer.

The method of any preceding clause, wherein at least one of the plurality of tensioning strings extends between the intermediate tensioning retainer and at least one of the inner tensioning retainer or the outer tensioning retainer.

The method of any preceding clause, further comprising: positioning a third blade segment between the first blade segment and the second blade segment along the radial direction, wherein the tensioning assembly passes through the third blade segment.

The method of any preceding clause, wherein an outer radial end of the first blade segment defines a locking protrusion and an inner radial end of the second blade segment defines a complementary recess for receiving the locking protrusion of the first blade segment.

The method of any preceding clause, further comprising: positioning a frangible blade tip at the tip of the airfoil assembly, wherein the tensioning assembly is connected to the frangible blade tip.

The method of any preceding clause, wherein the frangible blade tip comprises a plurality of adjacently positioned tip segments.

The method of any preceding clause, wherein each of the plurality of tip segments define an aperture, and wherein a dowel passes through the aperture of each of the plurality of tip segments to join the plurality of tip segments.

The method of any preceding clause, further comprising: positioning an outer blade skin around the first blade segment, the second blade segment, and the tensioning assembly.

An airfoil assembly extending along a radial direction between a root and a tip, the airfoil assembly comprising: a first blade segment positioned proximate the root of the airfoil assembly; and a frangible blade tip positioned at the tip of the airfoil assembly.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. An airfoil assembly extending along a radial direction between a root and a tip, the airfoil assembly comprising:

a first blade segment positioned proximate the root of the airfoil assembly;

a second blade segment positioned adjacent the first blade segment along the radial direction; and a tensioning assembly comprising a plurality of tensioning strings that extend between and mechanically couple the first blade segment and the second blade segment, wherein the plurality of tensioning strings comprises an outer string and a core string, wherein the outer string is formed from a different material than the core string.

2. The airfoil assembly of claim 1, wherein the plurality of tensioning strings is spaced apart along a camber line of the airfoil assembly.

3. The airfoil assembly of claim 1, wherein the plurality of tensioning strings comprises twisted or braided strands.

4. The airfoil assembly of claim 1, wherein the plurality of tensioning strings further comprises:

one or more outer strings positioned proximate at least one of a leading edge or a trailing edge of the airfoil assembly, the outer string being one of the one or more outer strings; and one or more core strings positioned interior to the one or more outer strings within the airfoil assembly, the core string being one of the one or more core strings, wherein the one or more outer strings are formed from a different material, have a different construction than the one or more core strings, or both.

5. The airfoil assembly of claim 1, wherein at least one of the plurality of tensioning strings extends at an angle relative to the radial direction.

6. The airfoil assembly of claim 1, wherein the tensioning assembly further comprises:

an inner tensioning retainer positioned proximate the root of the airfoil assembly such that the first blade segment is positioned between the inner tensioning retainer and the second blade segment along the radial direction, wherein the plurality of tensioning strings is anchored to the inner tensioning retainer.

7. The airfoil assembly of claim 1, wherein the tensioning assembly further comprises:

an outer tensioning retainer embedded within the second blade segment proximate the tip of the airfoil assembly, wherein the plurality of tensioning strings is anchored to the outer tensioning retainer.

8. The airfoil assembly of claim 1, wherein the tensioning assembly further comprises:

an intermediate tensioning retainer positioned within the first blade segment or the second blade segment.

9. The airfoil assembly of claim 1, wherein the tensioning assembly further comprises:

one or more side strings that extend between a leading edge and a trailing edge of the airfoil assembly.

10. The airfoil assembly of claim 9, wherein the one or more side strings are attached to the plurality of tensioning strings or are embedded in at least one of the first blade segment or the second blade segment.

11. The airfoil assembly of claim 9, wherein at least one of the one or more side strings has a first end positioned within the first blade segment and a second end positioned within the second blade segment.

12. The airfoil assembly of claim 1, further comprising:

a third blade segment positioned between the first blade segment and the second blade segment along the radial direction, wherein the tensioning assembly passes through the third blade segment.

13. The airfoil assembly of claim 1, wherein an outer radial end of the first blade segment defines a locking protrusion and an inner radial end of the second blade segment defines a complementary recess for receiving the locking protrusion of the first blade segment.

14. The airfoil assembly of claim 1, further comprising:

a frangible blade tip positioned at the tip of the airfoil assembly, wherein the tensioning assembly is connected to the frangible blade tip.

15. The airfoil assembly of claim 14, wherein the frangible blade tip comprises a plurality of adjacently positioned tip segments.

16. The airfoil assembly of claim 15, wherein each of the plurality of tip segments define an aperture, and wherein a dowel passes through the aperture of each of the plurality of tip segments to join the plurality of tip segments.

17. The airfoil assembly of claim 1, further comprising:

a blade skin positioned around the first blade segment, the second blade segment, and the tensioning assembly.

18. A method of manufacturing an airfoil assembly, the method comprising:

positioning a first blade segment of the airfoil assembly adjacent to a second blade segment of the airfoil assembly along a radial direction; and joining the first blade segment and the second blade segment using a tensioning assembly, the tensioning assembly comprising a plurality of tensioning strings that extend along the radial direction between the first blade segment and the second blade segment, wherein the plurality of tensioning strings comprises an outer string and a core string, wherein the outer string is formed from a different material than the core string.

19. The method of claim 18, further comprising:

positioning the first blade segment against an inner tensioning retainer; and anchoring the plurality of tensioning strings to the inner tensioning retainer such that the first blade segment is positioned between the inner tensioning retainer and the second blade segment along the radial direction.

20. The method of claim 18, further comprising:

positioning a blade skin around the first blade segment, the second blade segment, and the tensioning assembly.

* * * * *